United States Patent
Xiao et al.

(10) Patent No.: US 9,862,100 B1
(45) Date of Patent: Jan. 9, 2018

(54) ROBOT GRIPPER

(71) Applicant: Qinhuangdao Xinyue Intelligent Equipment Co., LTD., Qinhuangdao (CN)

(72) Inventors: Guoxin Xiao, Qinhuangdao (CN); Chong Li, Qinhuangdao (CN); Yan Sun, Qinhuangdao (CN)

(73) Assignee: QINHUANGDAO XINYUE INTELLIGENT EQUIPMENT CO., LTD. (CN)

( * ) Notice: Subject to any disclaimer, the term of this patent is extended or adjusted under 35 U.S.C. 154(b) by 0 days.

(21) Appl. No.: 15/594,553

(22) Filed: May 12, 2017

(30) Foreign Application Priority Data

Mar. 31, 2017 (CN) .......................... 2017 1 0207838

(51) Int. Cl.
*B25J 15/00* (2006.01)

(52) U.S. Cl.
CPC .............. *B25J 15/00* (2013.01); *Y10S 901/37* (2013.01)

(58) Field of Classification Search
CPC .... B25J 15/0038; B25J 15/08; B25J 15/0253; B25J 15/0047; B25J 15/0004; B25J 15/10; B25J 15/00; Y10S 901/32; Y10S 901/36; Y10S 901/34; Y10S 901/37; H01L 21/68707
USPC ................................................ 294/207, 213
See application file for complete search history.

(56) References Cited

U.S. PATENT DOCUMENTS

| | | | | |
|---|---|---|---|---|
| 2012/0286533 | A1* | 11/2012 | Mettler | B25J 15/0033 294/213 |
| 2012/0286534 | A1* | 11/2012 | Harada | B25J 15/026 294/213 |
| 2012/0286536 | A1* | 11/2012 | Murakami | B25J 15/10 294/213 |
| 2013/0140953 | A1* | 6/2013 | Miyazawa | H01L 41/0906 310/330 |
| 2013/0164113 | A1* | 6/2013 | Lada | H01L 21/67742 414/806 |

* cited by examiner

*Primary Examiner* — Stephen A Vu
(74) *Attorney, Agent, or Firm* — Kwan & Olynick LLP

(57) ABSTRACT

The present disclosure provides a robot gripper, comprising a bottom plate (101), a side plate A (102), an intermediate plate (103), a side plate B (104), guide rods (105), sliding blocks (106), cylinders (107), spherical joints (108), pneumatic quick plug connectors, a connecting plate (114), racks (115), a gear (116), a gear shaft (117), a horn type switch support (120), detection switches (121) and a detection head (122). By adopting the robot gripper, the bottom plate (101) can be connected with six-shaft flanges of a robot together by connectors; a gripper arm can be designed to connect the connecting plate (114) to grip a hub according to different demands; and the opening and closing state of the gripper can be detected by the detection switches (121). The robot gripper has the advantages of low price, compact overall structure, large clamping force, strong stability and the like.

1 Claim, 7 Drawing Sheets

ROBOT GRIPPER

RELATED APPLICATION

This application claims priority to Chinese Patent Application No. 201710207838.1, filed on Mar. 31, 2017, which is hereby incorporated by reference in its entirety.

TECHNICAL FIELD

The present disclosure relates to an automatic production line transfer device for aluminum alloy hubs.

BACKGROUND

The robot gripper is an indispensable tool on an aluminum alloy hub machining production line. The gripper in the prior art is large in clamping force and compact in structure, but expensive, and the maximum opening and closing stroke of the gripper is only 350 mm, so it is difficult to meet the requirement for manufacturing large-sized aluminum wheels.

SUMMARY

The present disclosure provides a robot gripper having an opening and closing stroke of 400 mm.

One of the technical solutions provided by the present disclosure is that a robot gripper includes a bottom plate, a side plate A, an intermediate plate, a side plate B, guide rods, sliding blocks, cylinders, spherical joints, pneumatic quick plug connectors, a connecting plate, racks, a gear, a gear shaft, a horn type switch support, detection switches and a detection head.

The bottom plate is connected with the intermediate plate, the side plate A and the side plate B together by bolts. The intermediate plate is provided with four circular through holes, four guide rods penetrate through the four circular through holes of the intermediate plate, and the two ends of the guide rods are respectively connected with the side plate A and the side plate B by bolts, thus forming a basic framework of the gripper. A left cylinder and a right cylinder are connected with the side plate A and the side plate B respectively, cylinder heads of the cylinders are connected with the two sliding blocks via the spherical joints, the guide rods penetrate through the sliding blocks with circular through holes, and the sliding blocks can slide freely along the guide rods. The connecting plate is fixed on the sliding blocks, and extraction and retraction of piston rods of the cylinders drive the sliding blocks to move left and right, thus realizing opening and closing of the gripper. A gripper arm of the robot gripper of the present disclosure can be designed to connect the connecting plate to grip a hub according to different demands.

Two racks are connected with the two sliding blocks respectively, the racks can move in grooves of the bottom plate, the gear shaft is fixed on the bottom plate, the gear can rotate around the gear shaft, and the two sliding blocks move synchronously via engagement transmission of the racks and the gear, thus ensuring the repeat precision of the gripper.

A pneumatic quick plug connector D and a pneumatic quick plug connector E are fixed on the intermediate plate; a pneumatic quick plug connector F and a pneumatic quick plug connector G are fixed on the intermediate plate; the pneumatic quick plug connector D is connected with the pneumatic quick plug connector G via an air hole of the intermediate plate; and the pneumatic quick plug connector E is connected with the pneumatic quick plug connector F via the air hole of the intermediate plate.

A pneumatic quick plug connector A is fixed on the side plate, and a pneumatic quick plug connector B and a pneumatic quick plug connector C are fixed on the cylinder.

The pneumatic quick plug connector C, the pneumatic quick plug connector A and the pneumatic quick plug connector D are connected by an air pipe; the pneumatic quick plug connector B and the pneumatic quick plug connector E are connected by the air pipe.

Compressed air drives opening and closing of the gripper via the pneumatic quick plug connector F and the pneumatic quick plug connector G at the outer part of the gripper.

The horn type switch support is fixed on the intermediate plate and the side plate; the two detection switches are fixed on the switch support, and the detection head is fixed on the connecting plate.

The connecting plate can drive the detection head to move, and the two detection switches can detect the opening and closing state of the gripper under the control of an electrical appliance.

By adopting the robot gripper, the bottom plate can be connected with six-shaft flanges of a robot together by connectors; the gripper arm can be designed to connect the connecting plate to grip a hub according to different demands; and the opening and closing state of the gripper can be detected by the detection switches.

Figure 1:
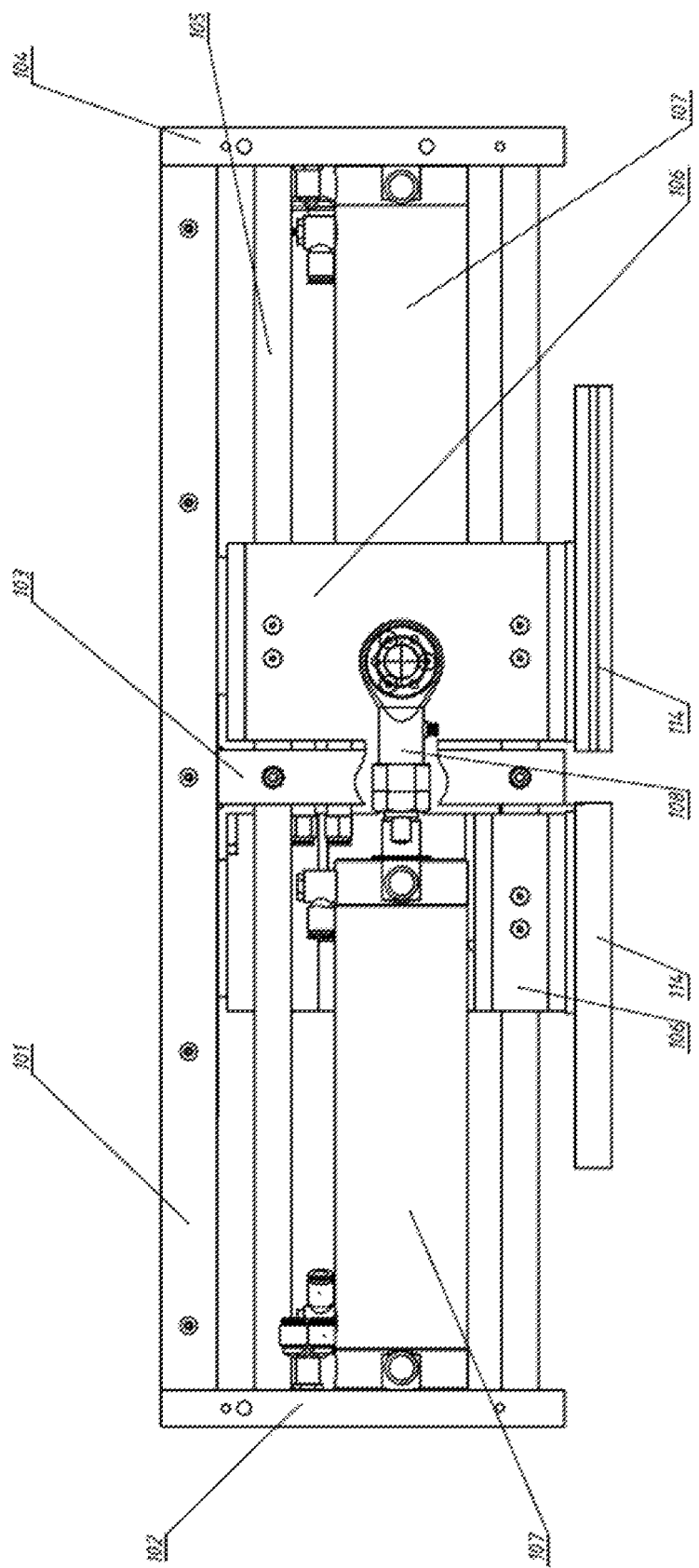
FIG. 1 is a front view of a robot gripper of the present disclosure.

In which: 101—bottom plate, 102—side plate A, 103—intermediate plate, 104—side plate B, 105—guide rod, 106—sliding block, 107—cylinder, 108—spherical joint, 109—pneumatic quick plug connector A, 110—pneumatic quick plug connector B, 111—pneumatic quick plug connector C, 112—pneumatic quick plug connector D, 113—pneumatic quick plug connector E, 114—connecting plate, 115—rack, 116—gear, 117—gear shaft, 118—pneumatic quick plug connector F, 119—pneumatic quick plug connector G, 120—horn type switch support, 121—detection switch, 122—detection head.

DETAILED DESCRIPTION OF THE EMBODIMENTS

A robot gripper includes a bottom plate 101, a side plate A 102, an intermediate plate 103, a side plate B 104, guide rods 105, sliding blocks 106, cylinders 107, spherical joints 108, pneumatic quick plug connectors, a connecting plate 114, racks 115, a gear 116, a gear shaft 117, a horn type switch support 120, detection switches 121 and a detection head 122.

FIG. 1 shows a front view of the shield-free robot gripper of the present disclosure.

The bottom plate 101 is connected with the intermediate plate 103, the side plate A 102 and the side plate B 104 together by bolts. The intermediate plate 103 is provided with four circular through holes, four guide rods 105 penetrate through the four circular through holes of the intermediate plate 103, and the two ends of the guide rods 105 are respectively connected with the side plate A 102 and the side plate B 104 by bolts, thus forming a basic framework of the gripper.

A left cylinder 107 and a right cylinder 107 are connected with the side plate A 102 and the side plate B 104 respectively, cylinder heads of the cylinders 107 are connected with the two sliding blocks 106 via the spherical joints 108, the guide rods 105 penetrate through the sliding blocks 106 with circular through holes, and the sliding blocks 106 can slide freely along the guide rods 105. The connecting plate 114 is fixed on the sliding blocks 106, and extraction and retraction of piston rods of the cylinders 107 drive the sliding blocks 106 to move left and right, thus realizing opening and closing of the gripper. A gripper arm of the robot gripper of the present disclosure can be designed to connect the connecting plate 114 to grip a hub according to different demands.

Figure 2:
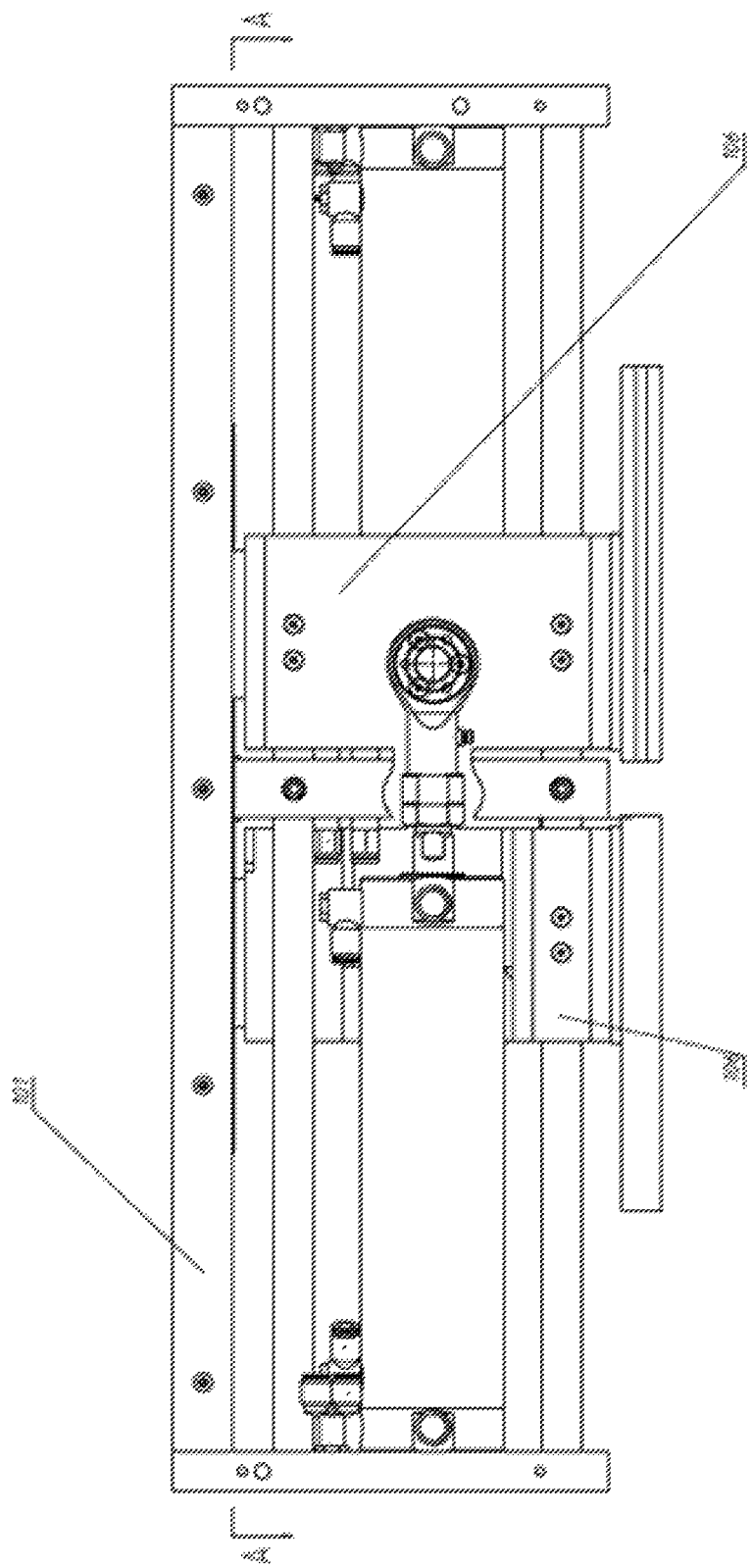
FIG. 2 is a front view of the shield-free robot gripper of the present disclosure.
Figure 3:
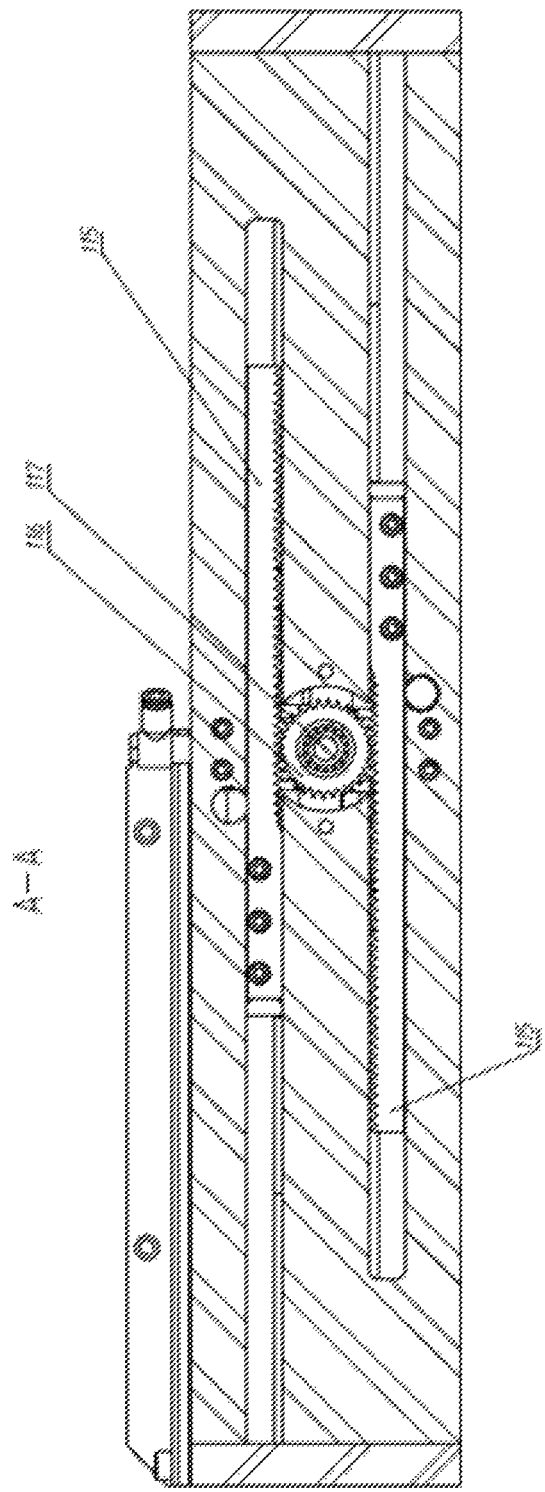
FIG. 3 is a section view of the front view of the shield-free robot gripper of the present disclosure in the A-A direction.

As shown in FIGS. 2 and 3, two racks 115 are connected with the two sliding blocks 106 respectively, the racks 115 can move in grooves of the bottom plate 101, the gear shaft 117 is fixed on the bottom plate 101, the gear 116 can rotate around the gear shaft 117, and the two sliding blocks 106 move synchronously via engagement transmission of the racks 115 and the gear 116, thus ensuring the repeat precision of the gripper.

Figure 4:
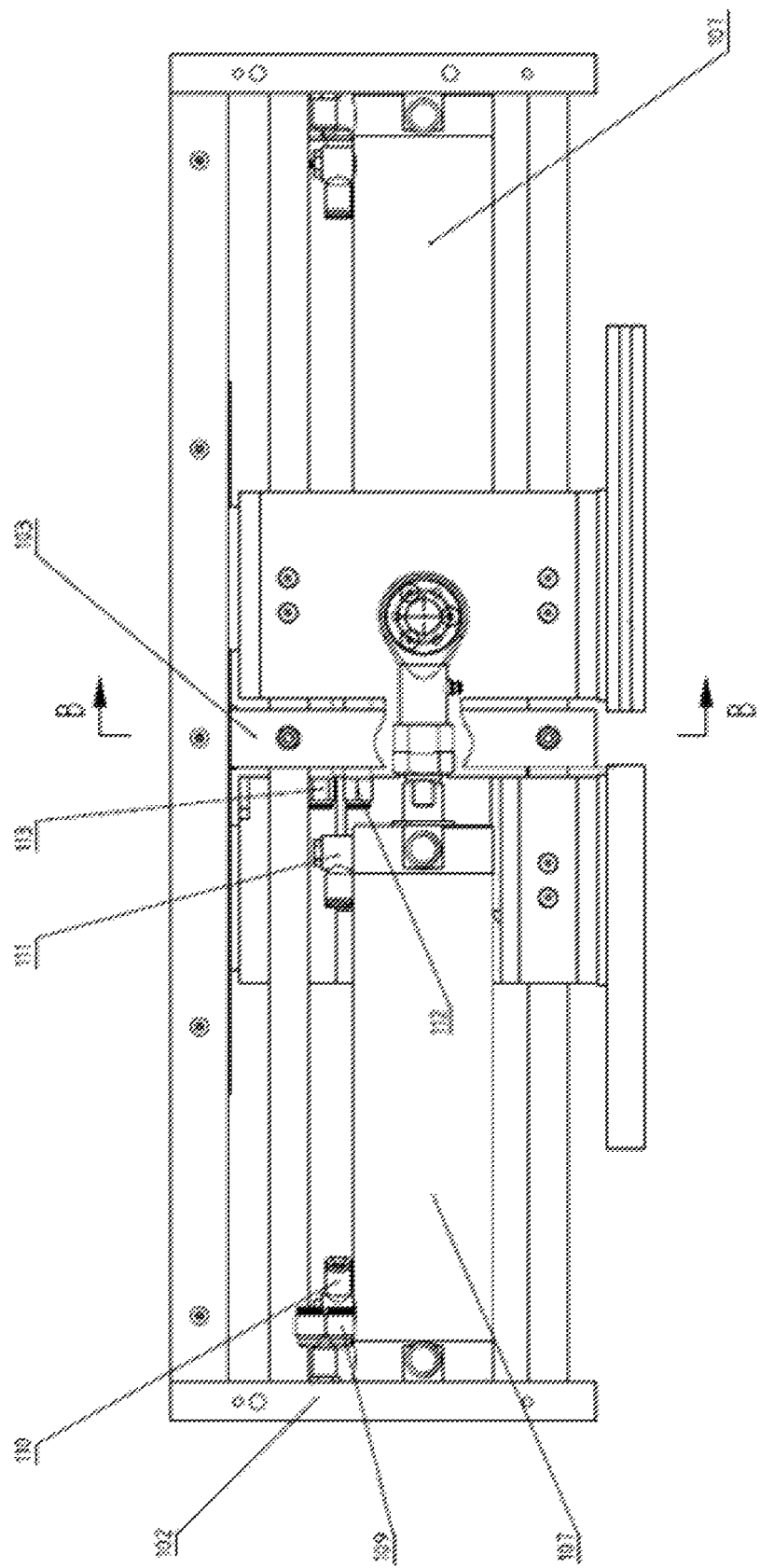
FIG. 4 is a front view of the shield-free robot gripper of the present disclosure.
Figure 5:
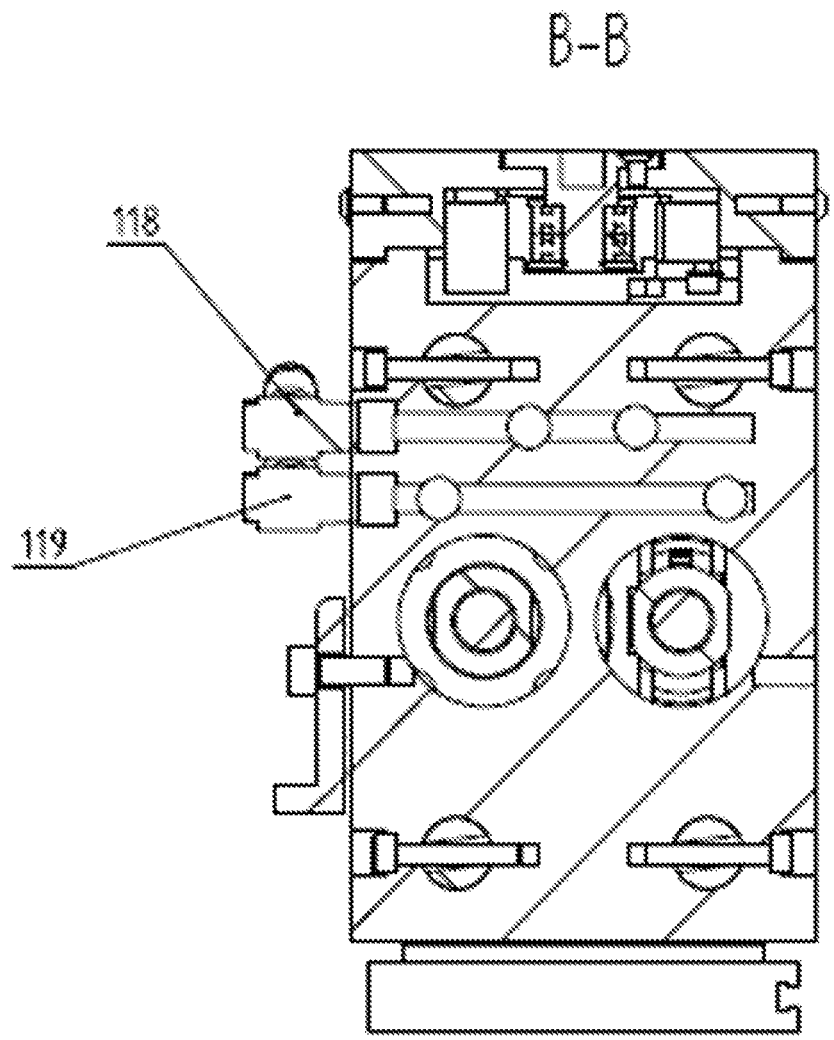
FIG. 5 is a section view of the front view of the shield-free robot gripper of the present disclosure in the B-B direction.

As shown in FIGS. 4 and 5, a pneumatic quick plug connector D 112 and a pneumatic quick plug connector E 113 are fixed on the intermediate plate 103; a pneumatic quick plug connector F 118 and a pneumatic quick plug connector G 119 are fixed on the intermediate plate 103; the pneumatic quick plug connector D 112 is connected with the pneumatic quick plug connector G 119 via an air hole of the intermediate plate 103; and the pneumatic quick plug connector E 113 is connected with the pneumatic quick plug connector F 118 via the air hole of the intermediate plate 103.

A pneumatic quick plug connector A 109 is fixed on the side plate 102, and a pneumatic quick plug connector B 110 and a pneumatic quick plug connector C 111 are fixed on the cylinder 107.

The pneumatic quick plug connector C 111, the pneumatic quick plug connector A 109 and the pneumatic quick plug connector D 112 are connected by an air pipe; the pneumatic quick plug connector B 110 and the pneumatic quick plug connector E 113 are connected by the air pipe.

Compressed air drives opening and closing of the gripper via the pneumatic quick plug connector F 118 and the pneumatic quick plug connector G 119 at the outer part of the gripper.

Figure 6:
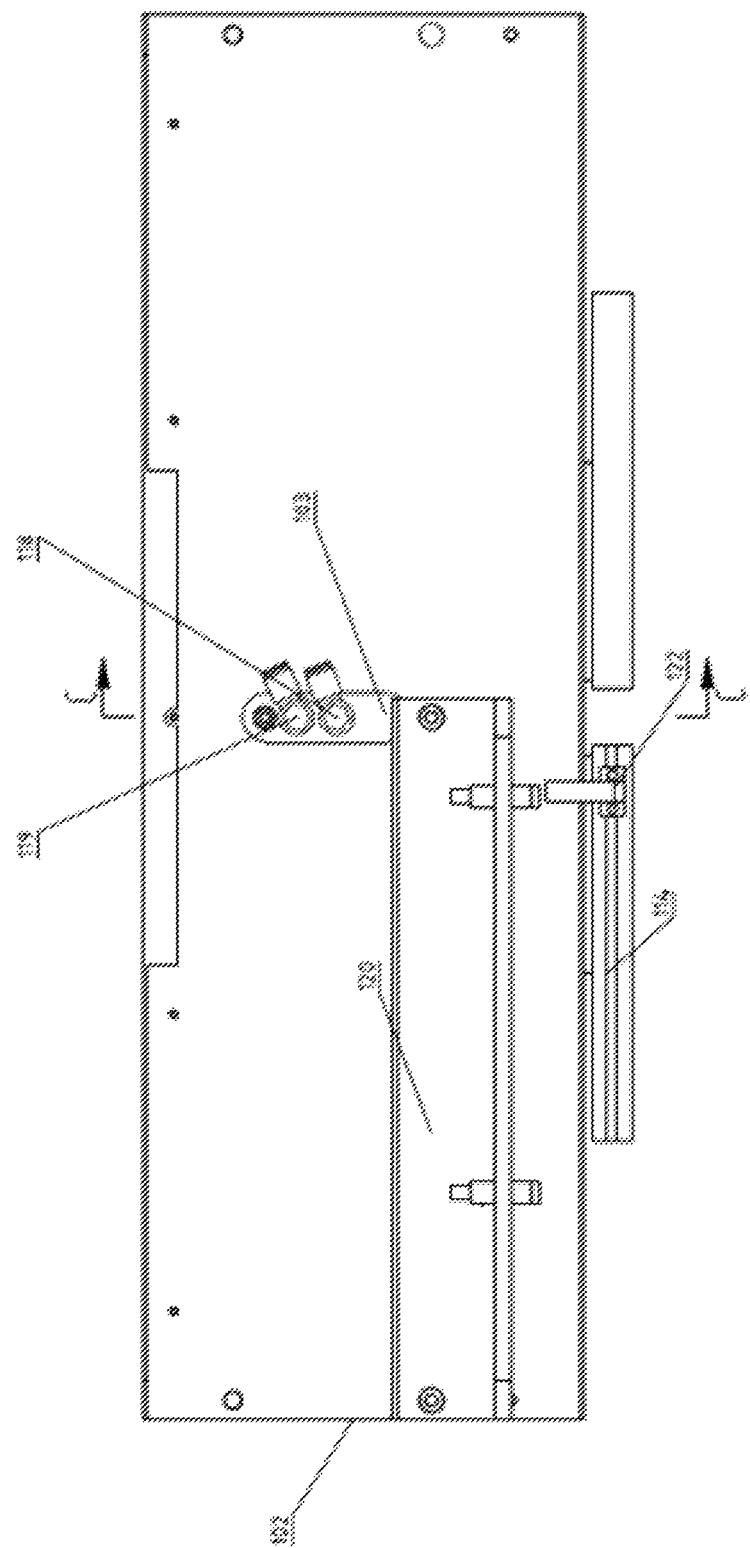
FIG. 6 is a top view of the robot gripper of the present disclosure.
Figure 7:
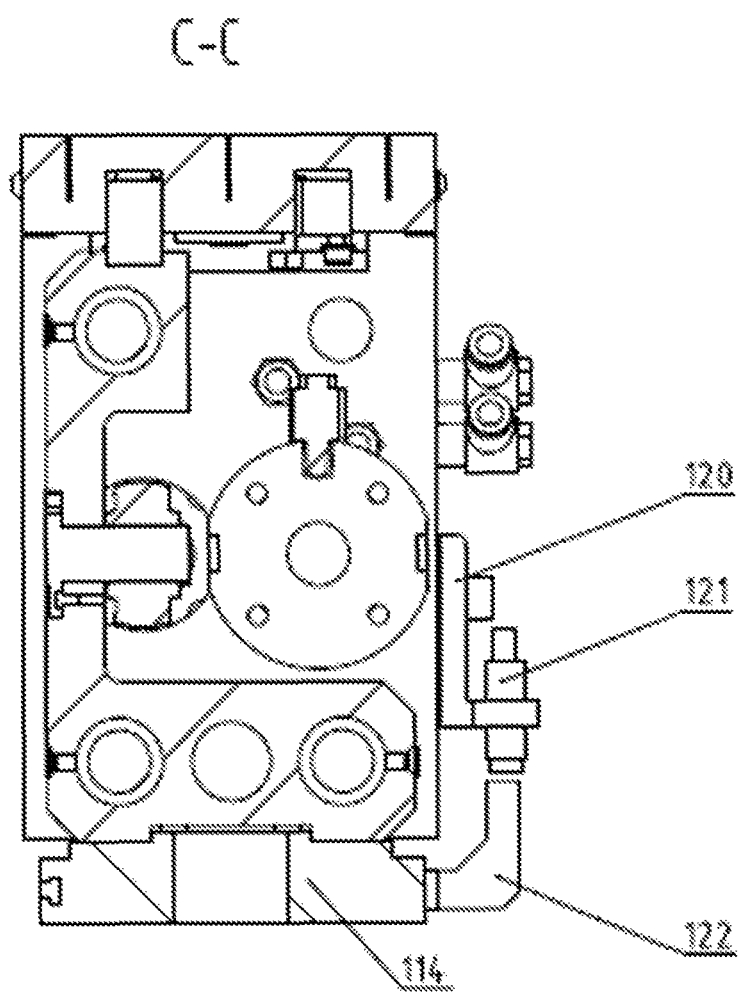
FIG. 7 is a section view of the top view of the robot gripper of the present disclosure in the C-C direction.

As shown in FIGS. 6 and 7, the horn type switch support 120 is fixed on the intermediate plate 103 and the side plate 102; the two detection switches 121 are fixed on the switch support 120, and the detection head 122 is fixed on the connecting plate 114.

The connecting plate 114 can drive the detection head 122 to move, and the two detection switches 121 can detect the opening and closing state of the gripper under the control of an electrical appliance.

By adopting the robot gripper, the bottom plate 101 can be connected with six-shaft flanges of a robot together by connectors; the gripper arm can be designed to connect the connecting plate 114 to grip a hub according to different demands; and the opening and closing state of the gripper can be detected by the detection switches 121.

The gripper has the advantages of low price, compact overall structure, large clamping force, strong stability and the like, and is an indispensable component on an automatic production line for aluminum alloy hubs.

The invention claimed is:

1. A robot gripper, comprising a bottom plate, a first side plate, an intermediate plate, a second side plate, guide rods, sliding blocks, cylinders, spherical joints, pneumatic quick plug connectors, a connecting plate, racks, a gear, a gear shaft, a horn switch support, detection switches and a detection head, is characterized in that the bottom plate is connected with the intermediate plate, the first side plate and the second side plate together by bolts, the intermediate plate is provided with four circular through holes, four guide rods penetrate through the four circular through holes of the intermediate plate, and the two ends of the guide rods are respectively connected with the first side plate and the second side plate by bolts, thus forming a basic framework of the gripper; a left cylinder and a right cylinder are connected with the first side plate and the second side plate respectively, cylinder heads of the cylinders are connected with the two sliding blocks via the spherical joints, the guide rods penetrate through the sliding blocks with circular through holes, and the sliding blocks can slide freely along the guide rods; the connecting plate is fixed on the sliding blocks;

two racks are connected with the two sliding blocks respectively, the racks can move in grooves of the bottom plate, the gear shaft is fixed on the bottom plate, and the gear can rotate around the gear shaft;

a first pneumatic quick plug connector and a second pneumatic quick plug connector are fixed on the intermediate plate; a third pneumatic quick plug connector and a second pneumatic quick plug connector are fixed on the intermediate plate; the first pneumatic quick plug connector is connected with the fourth pneumatic quick plug connector via an air hole of the intermediate plate; the second pneumatic quick plug connector is connected with the third pneumatic quick plug connector via the air hole of the intermediate plate;

a fifth pneumatic quick plug connector is fixed on the side plate, and a sixth pneumatic quick plug connector and a seventh pneumatic quick plug connector are fixed on the cylinder;

the seventh pneumatic quick plug connector, the fifth pneumatic quick plug A and the first pneumatic quick plug connector are connected by an air pipe; the sixth pneumatic quick plug connector and the second pneumatic quick plug connector are connected by the air pipe;

the horn switch support is fixed on the intermediate plate and the side plate; the two detection switches are fixed on the switch support, and the detection head is fixed on the connecting plate.

\* \* \* \* \*